(12) United States Patent
Ohashi et al.

(10) Patent No.: US 12,344,222 B2
(45) Date of Patent: Jul. 1, 2025

(54) MOTION MANAGER, CONTROL DEVICE OF BRAKE DEVICE, AND CONTROL METHOD

(71) Applicants: TOYOTA JIDOSHA KABUSHIKI KAISHA, Toyota (JP); ADVICS CO., LTD., Kariya (JP)

(72) Inventors: Yuta Ohashi, Toyota (JP); Kazuki Miyake, Okazaki (JP); Atsushi Kuchinomachi, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 196 days.

(21) Appl. No.: 18/232,887

(22) Filed: Aug. 11, 2023

(65) Prior Publication Data
US 2024/0101086 A1 Mar. 28, 2024

(30) Foreign Application Priority Data
Sep. 27, 2022 (JP) .................. 2022-153825

(51) Int. Cl.
*B60T 8/50* (2006.01)
*B60W 10/18* (2012.01)

(52) U.S. Cl.
CPC ........... *B60T 8/5025* (2013.01); *B60W 10/18* (2013.01); *B60W 2710/182* (2013.01)

(58) Field of Classification Search
CPC ................. B60T 8/5025; B60W 10/18; B60W 2710/182
See application file for complete search history.

(56) References Cited

U.S. PATENT DOCUMENTS

| | | | |
|---|---|---|---|
| 10,343,665 B2 * | 7/2019 | Farres | B60T 13/662 |
| 12,122,343 B2 * | 10/2024 | Miyake | B60T 8/171 |
| 2020/0070802 A1 * | 3/2020 | Yamada | B60W 30/02 |
| 2020/0070849 A1 * | 3/2020 | Suzuki | B60W 10/20 |
| 2022/0017062 A1 * | 1/2022 | Yamada | B60W 30/02 |
| 2022/0118957 A1 * | 4/2022 | Miyake | B60T 13/662 |
| 2022/0289199 A1 * | 9/2022 | Sun | B60W 60/00186 |
| 2024/0270230 A1 * | 8/2024 | Yamada | B60W 10/20 |
| 2024/0300459 A1 * | 9/2024 | Miyake | B60T 13/662 |
| 2025/0010872 A1 * | 1/2025 | Miyake | B60W 50/10 |

FOREIGN PATENT DOCUMENTS

JP 2020-32894 A 3/2020

* cited by examiner

*Primary Examiner* — Sizo B Vilakazi
(74) *Attorney, Agent, or Firm* — Oliff PLC

(57) ABSTRACT

A motion manager that is mounted on a vehicle includes a processor and a memory. The processor receives a motion request that corresponds to an application from individual applications. The processor arbitrates the received motion request. The processor generates, based on an arbitration result, an instruction value of an operation request to be output to a brake control unit. The memory stores, in advance, type information of an actuator to be controlled by the brake control unit. The processor generates the instruction value of the operation request using the type information.

6 Claims, 3 Drawing Sheets

MOTION MANAGER, CONTROL DEVICE OF BRAKE DEVICE, AND CONTROL METHOD

CROSS-REFERENCE TO RELATED APPLICATION

This application claims priority to Japanese Patent Application No. 2022-153825 filed on Sep. 27, 2022, incorporated herein by reference in its entirety.

BACKGROUND

1. Technical Field

The present disclosure relates to a motion manager, a control device of a brake device, and a control method.

2. Description of Related Art

Japanese Unexamined Patent Application Publication No. 2020-32894 (JP 2020-32894 A) describes a motion manager. The motion manager is mounted on a vehicle. The motion manager includes a reception unit, an arbitration unit, and a generation unit. The reception unit receives a request from a plurality of applications. The arbitration unit arbitrates a plurality of the requests received by the reception unit. The generation unit generates, for example, an instruction value of a motion request to be output to a brake control unit, based on the arbitration result by the arbitration unit.

SUMMARY

The motion manager described in JP 2020-32894 A may receive a plurality of preliminary braking requests from the applications. When each application requests preliminary braking, the instruction value for realizing preliminary braking differs depending on the type, structure, etc. of a brake device. Thus, when developing applications, each application must be designed so that the preliminary braking requests can be output in a mode that matches the type, structure, etc. of the brake device. Therefore, the burden of the application development is heavy. Although the preliminary braking of the brake device has been described above as an example, the same applies to a case when the brake device performs operations other than the preliminary braking or to a case of devices other than the brake device.

One aspect of the present disclosure is a motion manager configured to be mounted on a vehicle, and including one or more processors and one or more memories. The one or more processors are configured to: receive a motion request that corresponds to an application from individual applications; arbitrate the received motion request; and generate, based on an arbitration result, an instruction value of an operation request to be output to a control unit that is mounted on the vehicle. The one or more memories store, in advance, type information of an actuator to be controlled by the control unit. The one or more processors are configured to generate the instruction value using the type information.

Another aspect of the present disclosure is a control device configured to control a brake device of a vehicle, and including a motion manager. The motion manager includes one or more processors and one or more memories. The one or more processors are configured to: receive a motion request that corresponds to an application from individual applications; arbitrate the received motion request; and generate, based on an arbitration result, an instruction value of an operation request to be output to a control unit that is mounted on the vehicle. The one or more memories store, in advance, type information of an actuator to be controlled by the control unit. The one or more processors are configured to generate the instruction value using the type information.

According to each configuration described above, the memory stores, in advance, the type information of the actuator. The processor can generate the instruction value of the motion request using the type information of the actuator. Therefore, even when the mode of the operation request that is received from the application does not match the type, structure, etc. of the brake device, the instruction value of the motion request can be generated in order to realize the arbitrated operation request. Therefore, when developing applications, the development may be performed with a unified standard. That is, there is no need to develop an application for each type and structure of the actuator.

Another aspect of the present disclosure is a control method executed by a computer that is configured to be mounted on a vehicle. The control method includes: receiving a motion request that corresponds to an application from individual applications; arbitrating the received motion request; and generating, based on an arbitration result, an instruction value of an operation request to be output to a control unit that is mounted on the vehicle. Type information of an actuator is used in generating the instruction value, the type information being information stored in advance in the computer.

According to the above configuration, in a generation process, the instruction value of the motion request can be generated using the type information of the actuator, which is stored in advance in the computer. Therefore, even when the mode of the motion request that is received from the application does not match the type, structure, etc. of the brake device, the instruction value of the operation request can be generated in order to realize the arbitrated motion request. Therefore, when developing applications, the development may be performed with a unified standard. That is, there is no need to develop an application for each type and structure of the actuator.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiment

An embodiment of a motion manager, a control device that includes the motion manager, and a control method is described below. The control device that includes the motion manager is described below with reference to the drawings.

Outline of Vehicle

Figure 1:
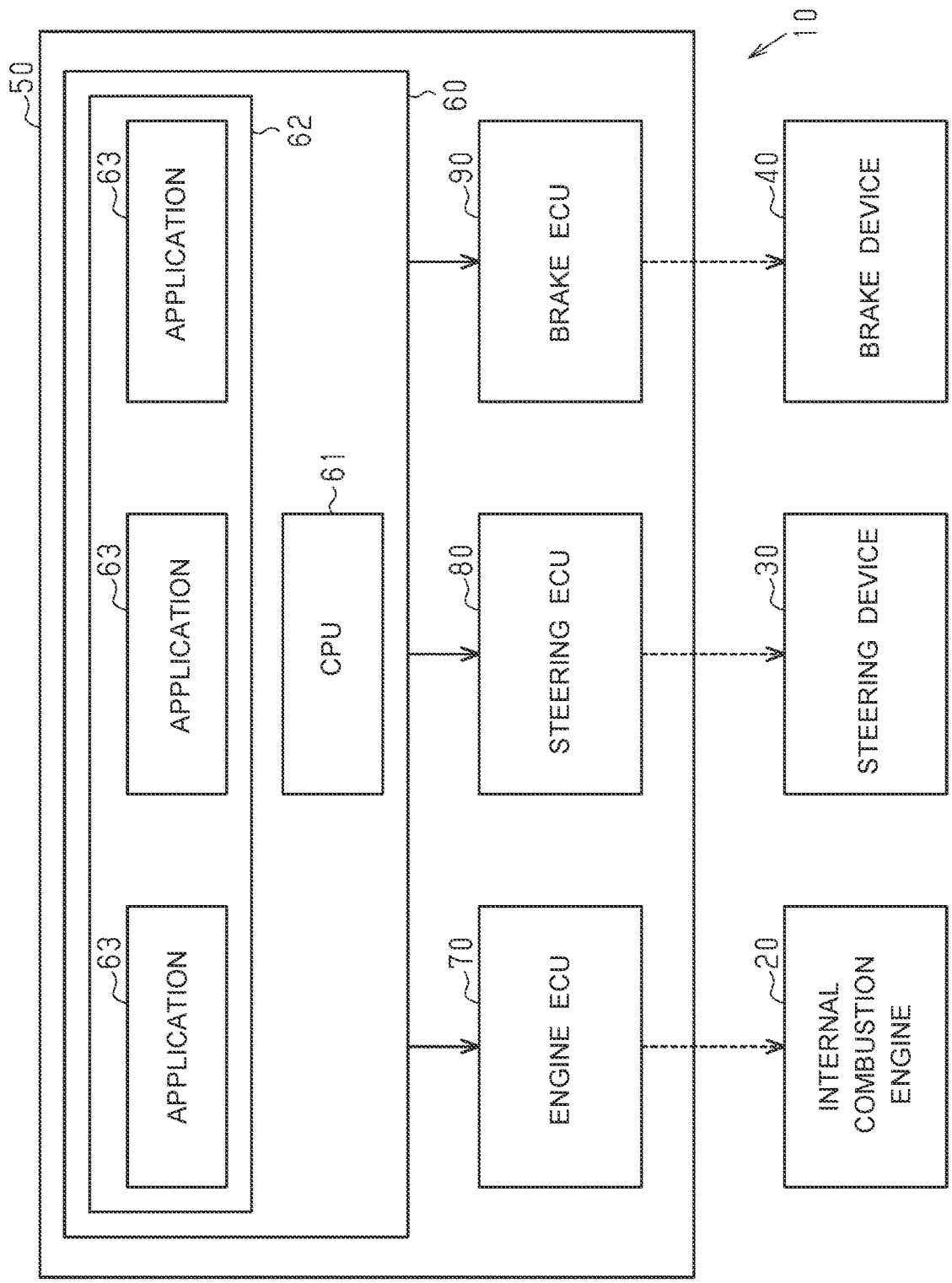
FIG. 1 is a schematic diagram showing an outline of a vehicle.

As shown in FIG. 1, a vehicle 10 includes an internal combustion engine 20, a steering device 30, a brake device 40, and a control device 50.

The internal combustion engine 20 is a driving source of the vehicle 10. Although not shown, the internal combustion engine 20 includes a plurality of actuators such as a throttle valve, a fuel injection valve, and an ignition device. The control device 50 controls the actuators described above. Accordingly, the internal combustion engine 20 burns fuel and drives the vehicle 10.

The steering device 30 changes the steering angle of a steering wheel of the vehicle 10. The steering device 30 includes an electric power steering system. The control device 50 controls the actuator. Accordingly, the electric power steering system assists the driver's steering operation. Further, the electric power steering system performs a fine adjustment of the driver's steering operation amount or an adjustment of the steering angle without the driver's operation, by the control of the actuator performed by the control device 50.

Figure 2:
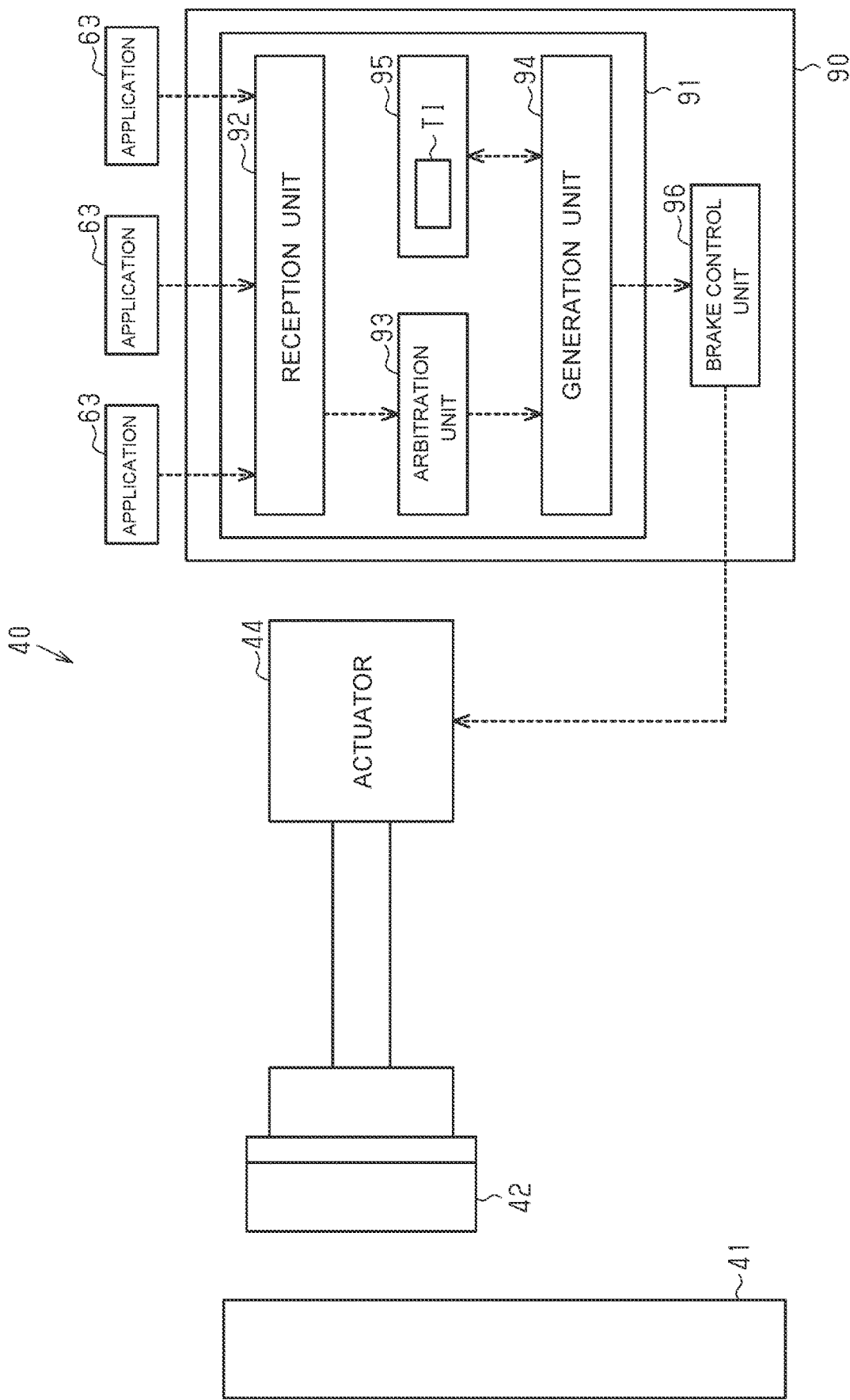
FIG. 2 is a schematic diagram showing a brake electronic control unit (ECU) and a brake device.

The brake device 40 is provided in each wheel of the vehicle 10. The brake device 40 is a disk brake that uses hydraulic pressure to generate braking force. As shown in FIG. 2, the brake device 40 includes a disk 41, a brake pad 42, and an actuator 44 that applies hydraulic pressure to the brake pad 42. That is, the actuator 44 outputs hydraulic pressure. The disk 41 is a rotating body that rotates integrally with the wheel of the vehicle 10. The brake pad 42 is a friction material supported by the vehicle body of the vehicle 10. The hydraulic pressure from the actuator 44 is controlled by the control device 50. The brake device 40 generates braking force in the vehicle 10 by bringing the disk 41 and the brake pad 42 into contact with each other.

As shown in FIG. 1, the control device 50 includes an advanced safety electronic control unit (ECU) 60, an engine ECU 70, a steering ECU 80, and a brake ECU 90. Each ECU can transmit and receive signals with each other via an internal bus (not shown).

The advanced safety ECU 60 realizes functions related to the driver assistance of the vehicle 10. Specifically, the advanced safety ECU 60 includes a central processing unit (CPU) 61 and a read only memory (ROM) 62. The ROM 62 stores a plurality of applications 63. Each application 63 is a program that realizes the functions of an advanced driver assistance system. An example of the applications 63 is an adaptive cruise control (ACC) application for follow-up traveling while maintaining a constant inter-vehicle distance from a preceding vehicle. The ACC application requests each actuator mounted on the vehicle 10 to accelerate and decelerate, so that the vehicle 10 can travel while maintaining a constant distance from the preceding vehicle.

Further, another example of the applications 63 is an auto speed limiter (ASL) application that recognizes a vehicle velocity limit and maintains the velocity of the vehicle 10 at or below the vehicle velocity limit. Furthermore, another example of the applications 63 is a collision damage reducing brake application that automatically brakes the vehicle 10 to reduce the damage of a collision, that is, a so-called autonomous emergency braking (AEB) application. In addition, another example of the applications 63 is a lane keeping support application that maintains the lane in which the vehicle 10 is traveling, that is, a so-called lane keeping assist (LKA) application.

The CPU 61 acquires detected values from a plurality of sensors (not shown) mounted on the vehicle 10. The CPU 61 uses the detected values from the sensors to execute each application 63 that is stored in the ROM 62. When the CPU 61 executes each application 63, the CPU 61 outputs a motion request corresponding to the application 63 so that the functions of each application 63 can be realized. Note that the CPU 61 may also execute the applications 63 at the same time. In this case, the CPU 61 outputs an individual motion request for each executed application 63.

The CPU 61 outputs each motion request to an ECU that includes a control unit of the actuator that needs to be controlled in order to realize the functions of each application 63. Specifically, the CPU 61 outputs the motion request to one or more ECUs selected from the engine ECU 70, the steering ECU 80, and the brake ECU 90.

The motion request output by the CPU 61 is a signal indicating the magnitude of the output requested to each of the actuators of the internal combustion engine 20, an actuator of the steering device 30, and the actuator 44 of the brake device 40. For example, the types of the motion request to the brake device 40 are divided into stages that consist of strong braking, medium braking, weak braking, first preliminary braking, second preliminary braking, and third preliminary braking, in descending order of the magnitude of the braking force output by the brake device 40. The hydraulic pressure output from the actuator 44 of the brake device 40 decreases in stages in the order of the strong braking, the medium braking, the weak braking, and the preliminary braking.

The first preliminary braking, the second preliminary braking, and the third preliminary braking are to reduce the distance between the disk 41 and the brake pad 42 in the brake device 40 compared to the state in which the actuator 44 does not output the hydraulic pressure. Specifically, the first preliminary braking is to make the distance between the disk 41 and the brake pad 42 zero. Further, the second preliminary braking and the third preliminary braking are to make the state in which the distance between the disk 41 and the brake pad 42 is smaller, although the disk 41 and the brake pad 42 are separated, compared to the state in which the actuator 44 does not output the hydraulic pressure. Furthermore, the third preliminary braking is to make the distance between the disk 41 and the brake pad 42 larger than the second preliminary braking. Therefore, when the first preliminary braking, the second preliminary braking, and the third preliminary braking are executed, the operation delay until the brake device 40 can exert the braking force is reduced. In addition, the operation delay increases in the order of the first preliminary braking, the second preliminary braking, and the third preliminary braking.

The motion request output by the CPU 61 as described above does not directly indicate the instruction value output to the actuator 44 of the brake device 40, for example. That is, the motion request is common to the brake device 40, and does not change according to the type of the brake device 40, for example. On the other hand, the motion request differs among devices with different functions, such as the internal combustion engine 20, the steering device 30, and the brake device 40.

The engine ECU 70 is a computer that includes a CPU and a ROM (not shown). The CPU of the engine ECU 70 controls the internal combustion engine 20 by executing a program that is stored in the ROM. That is, the engine ECU 70 is a control device that controls the internal combustion engine 20. In particular, the engine ECU 70 controls the internal combustion engine 20 based on the motion request from the advanced safety ECU 60.

The steering ECU 80 is a computer that includes a CPU and a ROM (not shown). The CPU of the steering ECU 80 controls the steering device 30 by executing a program that is stored in the ROM. That is, the steering ECU 80 is a control device that controls the steering device 30. In particular, the steering ECU 80 controls the steering device 30 based on the motion request from the advanced safety ECU 60.

The brake ECU 90 is a computer that includes a CPU and a ROM (not shown). The CPU of the brake ECU 90 controls the brake device 40 by executing a program that is stored in the ROM. That is, the brake ECU 90 is a control device that controls the brake device 40. In particular, the brake ECU 90 controls the brake device 40 based on the motion request from the advanced safety ECU 60.

Brake ECU

The operation when each application 63 that is stored in the advanced safety ECU 60 is executed is described below using a case of the brake ECU 90 as an example.

As shown in FIG. 2, the brake ECU 90 includes a motion manager 91 and a brake control unit 96. Although not shown, the brake ECU 90 includes the CPU and the ROM. The CPU of the brake ECU 90 realizes the functions of the motion manager 91 and the brake control unit 96 by executing a program for the motion manager and a program for a brake control that are stored in the ROM.

Figure 3:
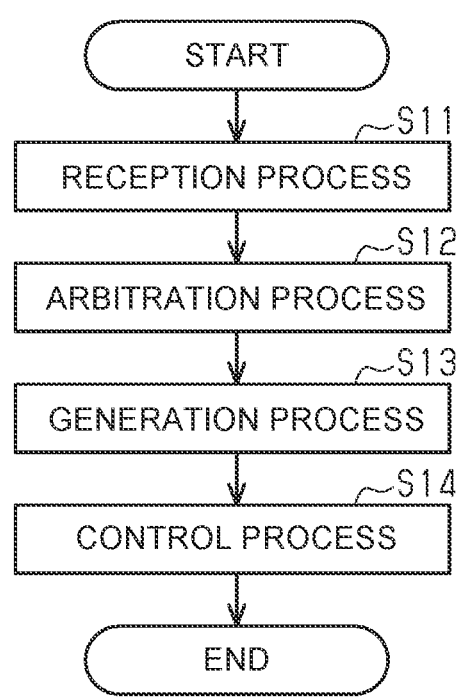
FIG. 3 is a flowchart showing a control method of the brake device.

Specifically, as shown in FIG. 3, the CPU of the brake ECU 90 executes a reception process S11, an arbitration process S12, a generation process S13, and a control process S14 by executing the program that is stored in the ROM. Therefore, the CPU of the brake ECU 90 functions as a reception unit 92, an arbitration unit 93, and a generation unit 94 in the motion manager 91. In addition, the CPU of the brake ECU 90 functions as the brake control unit 96.

The ROM of the brake ECU 90 prestores type information TI of the actuator 44 of the brake device 40 to be controlled by the brake control unit 96. The type information TI is information for identifying the type of the brake device 40 that is actually mounted on the vehicle 10 from among multiple types of the brake device 40 that can be mounted on the vehicle 10. Further, the ROM of the brake ECU 90 stores a plurality of instruction value maps in which each motion request and the instruction value of an operation request for realizing the motion request correspond to each other. The instruction value is a signal indicating the magnitude of the hydraulic pressure that is output by the actuator 44. The ROM of the brake ECU 90 stores the instruction value map for each type information TI.

As shown in FIG. 3, the brake ECU 90 starts controlling the brake device 40 when the motion request is input from the advanced safety ECU 60 in order to realize the functions of the advanced driver assistance system. When the control of the brake device 40 is started, the brake ECU 90 first performs the reception process S11. In the reception process S11, the reception unit 92 performs a process.

As shown in FIG. 2, the reception unit 92 can receive the motion requests corresponding to individual applications 63 from the advanced safety ECU 60. Specifically, each motion request is a signal indicating the magnitude of the braking force that is requested. In addition, as described above, the advanced safety ECU 60 may also execute the applications 63 at the same time. In this case, the reception unit 92 receives a plurality of motion requests and outputs the motion requests to the arbitration unit 93.

After that, as shown in FIG. 3, the brake ECU 90 advances the process to the arbitration process S12. In the arbitration process S12, the arbitration unit 93 performs a process. As shown in FIG. 2, the arbitration unit 93 arbitrates the motion request received by the reception unit 92. When there is only one motion request that is received by the reception unit 92, the arbitration unit 93 selects that motion request. On the other hand, when there are multiple motion requests that are received by the reception unit 92, the arbitration unit 93 selects the motion request that provides the largest braking force, thereby arbitrating the motion requests.

After that, as shown in FIG. 3, the brake ECU 90 advances the process to the generation process S13. In the generation process S13, the generation unit 94 performs a process. In the generation process S13, the generation unit 94 generates an instruction value of the operation request to be output to the brake control unit 96 that is mounted on the vehicle 10, based on the arbitration result by the arbitration unit 93. At this time, the generation unit 94 generates the instruction value of the operation request using the type information TI of the actuator 44 and the instruction value map corresponding to the type information TI that are stored in a storage unit 95.

Here, it is assumed that, for example, the first preliminary braking is selected as the motion request in the arbitration by the arbitration unit 93. Even in the same first preliminary braking, when the type of the actuator 44 is different, for example, the instruction value for realizing the first preliminary braking may differ. For example, even when the instruction value for realizing the first preliminary braking with a "type A" actuator 44 is "X value," the instruction value for realizing the first preliminary braking with a "type B" actuator 44 may be "Y value." Accordingly, the generation unit 94 identifies the instruction value map corresponding to the type information TI. Then, the generation unit 94 identifies the value corresponding to the motion request that is arbitrated by the arbitration unit 93 in the identified instruction value map, and generates the value as the instruction value of the operation request.

After that, as shown in FIG. 3, the brake ECU 90 advances the process to the control process S14. In the control process S14, the brake control unit 96 performs a process. As shown in FIG. 2, the brake control unit 96 outputs the instruction value of the operation request that is generated by the generation unit 94 to the actuator 44 of the brake device 40. As a result, the brake control unit 96 controls the brake device 40 by driving the actuator 44. After that, the brake ECU 90 ends the series of processes.

Operations of Embodiment

According to the above embodiment, each application 63 outputs, to the brake ECU 90, any of multiple types of the motion request, instead of a specific instruction value for the actuator 44 of the brake device 40. The motion manager 91 outputs the instruction value of the operation request to the actuator 44 so as to satisfy the requested motion request, according to the type of the brake device 40.

Effects of Embodiment (1) According to the above embodiment, the storage unit 95 stores, in advance, the type information TI of the actuator 44. Further, the generation unit 94 generates the instruction value of the operation request using the type information TI of the actuator 44. Therefore, the motion request that is received from the applications 63 does not need to be a specific instruction value that matches the type, structure, etc. of the brake device 40, and may be any of the motion requests that are determined in advance. Therefore, when developing the applications 63, the development may be performed with a unified standard according to the motion request described above. That is, there is no need to develop an individual application 63 that can output an appropriate and specific instruction value for each type and structure of the actuator 44.

(2) According to the above embodiment, the actuator 44 is included in the brake device 40. The brake device 40 is likely to receive the motion request from each application 63 that realizes the functions of the advanced driver assistance system. In addition, there are countless types of the brake device 40 according to the types of the vehicle 10. Therefore, the configuration of the above embodiment may be adopted for the applications 63 that realize the motion request by operating the brake device 40.

(3) According to the above embodiment, the actuator 44 outputs hydraulic pressure. Further, the instruction value of the operation request to the actuator 44 is a signal indicating the magnitude of the hydraulic pressure that is output by the actuator 44. When the output of the actuator 44 is the hydraulic pressure, the braking force that is output by the brake device 40 or the operation waiting time due to the preliminary braking is greatly affected by the type and the structure of the brake device 40. Therefore, the effect of storing the type information TI of the brake device 40 in the storage unit 95 is obtained.

(4) According to the above embodiment, when the reception unit 92 receives a plurality of the motion requests, the arbitration unit 93 selects the motion request that provides the largest hydraulic pressure that is indicated by the instruction value of the operation request, thereby arbitrating the motion requests. Therefore, when the braking force is needed, a motion request that provides a larger braking force can be selected. Further, when only the motion request for the preliminary braking is received, the motion request that provides a shorter operation waiting time can be selected. Therefore, it is possible to suppress insufficient braking force and an excessively long operation waiting time.

(5) The instruction value of the operation request for operating the brake device 40 so as to obtain the operation waiting time that is requested by the motion request particularly differs according to the type, structure, etc. of the brake device 40. Therefore, when developing applications 63, in order to realize preliminary braking with a different length of operation waiting time, more detailed information on the type and the structure of the brake device 40 is needed than for the original braking that generates the braking force. Specifically, the corresponding relationship between the extent of the instruction value of the operation request and the extent of the size of the gap between the disk 41 and the brake pad 42 strongly depends on the type and the structure of the brake device 40. According to the above embodiment, the types of the motion request from the applications 63 include a plurality of preliminary braking with zero braking force. Then, the generation unit 94 can generate the instruction value that is requested to the actuator 44 regarding the motion request for the preliminary braking, using the type information of the actuator 44 of the brake device 40, which is stored in the storage unit 95. Therefore, when performing the motion request for the preliminary braking, it is possible to reduce the burden of the development of the applications 63, which may become larger.

OTHER EMBODIMENTS

The above embodiment can be implemented with the following modifications. The above embodiment and the following modifications can be combined with each other within a technically consistent range to be implemented.

The vehicle 10 may include a motor that serves as a driving source for the vehicle 10 in addition to or instead of the internal combustion engine 20. In this case, the control device 50 may include a motor ECU that controls the motor in addition to or instead of the engine ECU 70.

The type and the structure of the brake device 40 are not limited to the structure of the above embodiment. When the storage unit 95 stores the type information TI of the actuator 44 of the brake device 40, the motion manager 91 can generate an operation request in accordance with the type and the structure of the brake device 40.

The actuator 44 is not limited to an actuator that outputs hydraulic pressure. The type may be appropriately changed to a different type according to the braking force that is generated by the brake device 40, etc. Even in this case, when the storage unit 95 stores the type information TI of the brake device 40, the generation unit 94 can generate an appropriate output value of the operation request.

In the above embodiment, the motion manager 91 is included in the brake ECU 90, and the control of the brake device 40 has been described as an example, but the ECU that includes the motion manager is not limited to this. For example, the motion manager may be included in at least one of the engine ECU 70 and the steering ECU 80, in addition to or instead of the brake ECU 90. In this case, for example, in the motion manager included in the engine ECU 70, it is only necessary that a storage unit of the motion manager stores the type information of each actuator of the internal combustion engine 20. Further, it is only necessary that a generation unit of the motion manager generates the instruction value of the operation request using the type information of the actuator of the internal combustion engine 20 that is stored in the storage unit.

Even when the motion manager 91 controls the brake device 40, the configuration is not limited to a case where the motion manager 91 is included in the brake device 40. For example, the motion manager 91 may be included in the advanced safety ECU 60. Further, for example, the control device 50 may include a management ECU that collectively manages the internal combustion engine 20, the steering device 30, and the brake device 40. In this case, the motion manager 91 may be included in the management ECU.

The control device 50 may be divided into a device that includes the motion manager 91 and a device that includes the brake control unit 96. That is, the CPU that executes the reception process S11, the arbitration process S12, and the generation process S13 may be different from the CPU that executes the control process S14.

In the above embodiment, the applications 63 are executed by the same CPU 61 in the advanced safety ECU 60, but the present disclosure is not limited to this. Individual applications 63 may be executed by different CPUs.

The applications 63 are not limited to the applications exemplified in the above embodiment. For example, the application 63 may be an intelligent speed assistance (ISA) application that controls the velocity of the vehicle 10 so that the velocity does not exceed the upper limit velocity.

The motion request that is output to the motion manager 91 by executing the applications 63 is not limited to the signal indicating the magnitude of the braking force. The motion request can be appropriately changed according to the type of the ECU to which the motion request is output. For example, for the motion request to the steering device 30, the motion request may be a signal indicating the magnitude of the steering angle.

The arbitration unit 93 need not arbitrate the motion request based on the magnitude of the output value of the operation request. For example, the arbitration unit 93 may arbitrate by selecting a signal from the application 63 with a high degree of urgency. More specifically, for example, when the reception unit 92 receives the motion requests from the AEB application and the LKA application, the arbitration unit 93 may arbitrate by selecting the motion request from the AEB application with a high degree of urgency.

Each application 63 may output the requested acceleration as the motion request when the magnitude of the braking force is greater than zero among the motion requests. That is, in this case, the technique of the above embodiment may be applied only to the motion requests for the first preliminary braking to the third preliminary braking in which the magnitude of the braking force is zero. It is possible to reduce the burden when developing the applications 63 that perform the motion request for the preliminary braking.

In the above embodiment, the generation unit 94 uses the instruction value map that is stored in the storage unit 95 to generate the instruction value of the operation request, but the present disclosure is not limited to this. For example, instead of using the instruction value map, the generation unit 94 may multiply the reference value by a coefficient according to the type of the actuator 44 to generate the instruction value.

What is claimed is:

1. A motion manager configured to be mounted on a vehicle, the motion manager comprising:
   one or more processors configured to
      receive a motion request that corresponds to an application from individual applications,
      arbitrate the received motion request, and
      generate, based on an arbitration result, an instruction value of an operation request to be output to a control unit that is mounted on the vehicle; and
   one or more memories that store, in advance, type information of an actuator to be controlled by the control unit,
   wherein the one or more processors are configured to generate the instruction value using the type information.

2. The motion manager according to claim 1, wherein the actuator is included in a brake device configured to apply a braking force to the vehicle.

3. The motion manager according to claim 2, wherein:
   the actuator is configured to output hydraulic pressure; and
   the instruction value is a signal indicating magnitude of the hydraulic pressure that is output by the actuator.

4. The motion manager according to claim 3, wherein the one or more processors are configured to, when receiving a plurality of motion requests, select the motion request that provides the largest hydraulic pressure that is indicated by the instruction value to arbitrate the motion requests.

5. A control device configured to control a brake device of a vehicle, the control device comprising a motion manager that includes:
   one or more processors configured to
      receive a motion request that corresponds to an application from individual applications,
      arbitrate the received motion request, and
      generate, based on an arbitration result, an instruction value of an operation request to be output to a control unit that is mounted on the vehicle; and
   one or more memories that store, in advance, type information of an actuator to be controlled by the control unit,
   wherein the one or more processors are configured to generate the instruction value using the type information.

6. A control method executed by a computer that is configured to be mounted on a vehicle, the control method comprising:
   receiving a motion request that corresponds to an application from individual applications;
   arbitrating the received motion request; and
   generating, based on an arbitration result, an instruction value of an operation request to be output to a control unit that is mounted on the vehicle,
   wherein type information of an actuator is used in generating the instruction value, the type information being information stored in advance in the computer.

* * * * *